United States Patent Office 3,651,210
Patented Mar. 21, 1972

3,651,210
SYNTHETIC EMULSION-GRAFT COPOLYMERS FURTHER REACTED WITH PROTEIN
Terry H. Shepler, St. Paul, Minn., and Donald S. Lord, Columbus, Ohio, assignors to Ashland Oil, Inc., Houston, Tex.
No Drawing. Filed May 15, 1970, Ser. No. 37,872
Int. Cl. C08f 29/36
U.S. Cl. 424—78
20 Claims

ABSTRACT OF THE DISCLOSURE

The chemical reaction of a reactive synthetic emulsion and protein produces a co-polymer which is an excellent adhesive coating or film. This reactive synthetic emulsion—protein polymer is biodegradable in normal sewage facilities. It is an excellent coating material for leather and vinyl fabrics, because of its flexibility and semipermeability. The reactive synthetic emulsion is an interpolymer of: (1) ester of $\alpha,\beta$-unsaturated carboxylic acid; (2) ester of an $\alpha,\beta$-unsaturated carboxylic acid in which the ester portion contains an oxirane ring; (3) monoethenically unsaturated compound containing a vinyl group; (4) $\alpha,\beta$-unsaturated mono- or di-carboxylic acid or salt thereof.

---

This invention relates to interpolymers containing protein and processes for their preparation. In one aspect this invention relates to novel interploymers of components selected from the following classes of compounds: (1) ester of $\alpha,\beta$-unsaturated carboxylic acid; (2) ester of $\alpha,\beta$-unsaturated carboxylic acid in which the ester portion contains an oxirane ring; (3) monoethenically unsaturated compound containing a vinyl group; (4) $\alpha,\beta$-unsaturated mono- or di-carboxylic acid or salt thereof; and (5) protein. Other aspects of this invention relate to processes for preparing the above interpolymers; processes for forming emulsions, which when interpolymerized form semipermeable, leather-like coatings; and processes for forming adhesives of the novel interpolymers.

Materials which are interpolymers of components (1), (2), (3), and (4) are known in the art, as are protective and decorative films of such materials. While these materials are described in general in U.S. Pat. No. 3,297,621, other interpolymers outside the scope of interpolymers mentioned in this patent are possible from these classes of compounds. These materials are useful for coating applications, but because of their properties, these copolymer emulsions are extremely resistant to biodegradation in sewage treatment facilities. Thus, the use of copolymer emulsions as adhesives and coatings for disposable paper and textile applications has created difficulties in sewage treatment facilities. Likewise, if pure proteinaceous materials are utilized as binders or adhesives or coatings in these applications, they will not resist normal wear properties in paper and textile adhesives. In addition, the films of proteinaceous materials are not resistant to water or solvent treatment.

The inventors have unexpectedly found that a reactive synthetic emulsion prepared from components (1), (2), (3), and (4) can be chemically combined with proteinaceous material to produce what the inventors believe to be a reactive synthetic emulsion-protein graft copolymer. This synthetic emulsion-protein polymer is a material which exhibits excellent coating and adhesive properties. It is resistant to water and dry cleaning solvents and is capable of forming continuous semi-permeable films. Moreover, films or adhesives made from this reactive synthetic emulsion-protein polymer are biodegradable under sewage treatment conditions. A coating and adhesive material produced from this system offers the advantages of a synthetic emulsion along with the biodegradability of the protein. It is superior to blends of non-reactive synthetic emulsions and proteinaceous materials, which blends do not exhibit the water or solvent resistance of the reactive synthetic emulsion-protein polymers. The physical blend of a non-reactive emulsion and protein is known in the art. The chemical combinations of a reactive synthetic emulsion described in this invention with proteinaceous material offers unique resistance properties while still maintaining the biodegradability properties of the protein.

The interpolymers of this invention are, in contrast to the prior art materials, biodegradable in conventional sewage treatment facilities, but at the same time are quite durable in use (e.g., as adhesive or binder in textile or paper articles) and are especially durable if treated with a small fraction of a fungicide to prevent biological breakdown during use. Moreover, treatment with a water-soluble fungicide would not detract from the biodegradability of the interpolymers of this invention, because repeated treatment with water will remove the water-soluble fungicide, leaving the interpolymer to biodegrade in the usual manner.

The interpolymers of this invention are further useful in that they form semipermeable, leather-like coating or films. When formed these films may be hazy and somewhat inflexible and brittle, but upon exposure to moisture these films become clear and flexible. The films formed from the interpolymers of this invention breathe similar to leather, resist laundering and dry cleaning similar to vinyl fabrics and, when treated with a water-insoluble fungicide, resist biogradation similar to conventional synthetic emulsions. Films of the interpolymers of this invention are, therefore, excellent leather substitutes, and are easily made in any desired strength and flexibility depending upon the ratios of synthetic emulsion to protein employed. Also, they are readily pigmented with conventional pigments.

When components (1), (2), (3), (4), and (5) are combined simultaneously for interploymerization utilizing conventional polymerization techniques, a high viscosity emulsion is produced which is unsuitable for forming films or adhesives. Therefore, when preparing the interpolymers of this invention, the reactive synthetic emulsion of components (1), (2), (3), and (4) is prepared in accordance with the procedure disclosed in U.S. Pat. No. 3,297,621 issued to Taft. In accordance with that procedure a first monomer charge is prepared which includes the entire quantity of the ester of the $\alpha,\beta$-unsaturated carboxylic acid, a portion of the ester of the $\alpha,\beta$-unsaturated carboxylic acid in which the ester contains an oxirane ring, a portion of the $\alpha,\beta$-unsaturated mono- or di-carboxylic acid or salt, and approximately 10–70% by weight, e.g., 10–60% by weight of the monoethenically unsaturated compound which by itself forms a hard polymer. The remaining portions of components (2), (3), and (4) are added as a second charge. In this respect, it is important that each of the first four classes of copolymerizable monomers be represented by at least one monomer. Thus, ester of $\alpha,\beta$-unsaturated carboxylic acid in which the ester portion contains an oxirane ring might be represented by glycidyl acrylate, only, while monoethenically unsaturated compound might be represented by a mixture of styrene and methyl methacrylate. Regarding the unsaturated carboxylic acid containing the oxirane ring and the unsaturated carboxylic acid or salt, it has been found that best results are obtained when a major portion of one is employed in the first charge and a minor portion of the other in the same charge, and vice versa in connection with the second charge. In any event, the predominant ingredient in the second charge will be the monoethenically unsaturated compound.

By employing this split-addition technique of forming the reacting synthetic emulsion, the formation of blocks of the ester of the α,β-unsaturated carboxylic acid is believed favored during the first monomer addition and the formation of blocks of the vinyl containing compound is believed favored during the second addition. Therefore, a large degree of block polymerization occurs.

In accordance with this procedure for preparing the reactive synthetic emulsion, liquid phase, catalyzed emulsion polymerization techniques are employed to combine components (1), (2), (3), and (4). The applicable range of quantities of the monomeric susbtances employed are as follows:

(1) 20–90% by weight of ester of α,β-unsaturated carboxylic acid;
(2) 20–1% by weight of ester of α,β-unsaturated carboxylic acid in which the ester portion contains an oxirane ring;
(3) 50–8% by weight of monoethenically unsaturated compound containing a vinyl group; and
(4) 10–1% by weight of an unsaturated mono- or di-carboxylic acid or salt thereof.

The preferred range of quantities of the monomeric substances employed are as follows:

(1) 35–75% by weight of ester of α,β-unsaturated carboxylic acid;
(2) 10–2% by weight of ester of α,β-unsaturated carboxylic acid in which the ester portion contains an oxirane ring;
(3) 45–10% by weight of monoethenically unsaturated compound containing a vinyl group; and
(4) 8–3% by weight of unsaturated mono- or di-carboxylic acid or salt thereof.

To form the reactive synthetic emulsion, components (1), (2), (3), and (4) are divided into a first charge and a second charge as described above. The first charge (which may be termed premix A) is slowly added at, for example, 160° F., to a previously prepared aqueous emulsifying solution containing anionic and/or non-ionic surfactants and a suitable catalyst. Although the addition temperature (for premix A) can range from room temperature to the boiling point of water, experience has shown that temperatures of from 150° to 190° F., more usually from 160° to 180° F., are especially desirable. The pressure employed in preparing the synthetic emulsion is preferably atmospheric or substantially atmospheric. However, reduced and elevated pressures can also be used, e.g., elevated pressures are desirable where a volatile monomer has been used. During the addition of premix "A," a rise in temperature is effected to between about 150° to 212° F., more usually from 180° to 205° F., e.g., 195°–200° F. Then, the second charge (premix B) is added over a period of time, as exemplified in the examples set forth below, and the temperature is permitted to rise, frequently to between about 200°–210° F. At the end of the addition of premix "B," the formation of the synthetic emulsion is thus complete. Other synthetic emulsions containing monomers (1), (2), (3), and (4) can be employed in this invention. However, the emulsions of (1), (2), (3), and (4) prepared as in U.S. Pat. No. 3,297,621 are especially preferred in forming the protein-reactive synthetic emulsion polymers of this invention.

To form the interpolymers of this invention the above reactive synthetic emulsion is heated to a temperature of between about 140° to 212° F., usually from 160° to 210° F., e.g., 180°–200° F. and the protein is immediately added and the temperature maintained for about ½ to about 4 hours, usually about 1 to about 3½ hours, e.g., 2 to 3 hours. The synthetic emulsion-protein graft copolymer is then cooled and the pH adjusted to between about 6 and 10, preferably 8 and 9, and cast as a film or coating and cured. The interpolymers of this invention, i.e., the reactive synthetic emulsion-protein graft copolymers, will normally air-cure at room temperature. However, higher temperatures, e.g., up to about 375° F., preferably between 275° and 325° F., may be employed to aid in curing. The synthetic emulsion to protein weight ratio may range from about 8:1 to about 0.3:1, preferably about 4:1 to about 0.4:1 and most preferably between 1.5:1 to 1:1. While reacting the synthetic emulsion and the protein the pressure employed is preferably atmospheric or substantially atmospheric, although reduced or elevated pressures can be used.

For the reactive synthetic emulsion, applicable esters of an α,β-unsaturated caboxylic acid are the various acrylates and methacrylates such as, for example, ethyl acrylate, iso-butyl acrylate, n-butyl acrylate, 2-ethylhexyl acrylate, methyl acrylate, n-propyl acrylate, isopropyl acrylate, isobutyl acrylate, amyl acrylate, isoamyl acrylate, hexyl acrylate, octyl acrylate, 3,5,5-trimethyl hexyl acrylate, decyl acrylate, dodecyl acrylate, cetyl acrylate, octodecyl acrylate, octadecenyl acrylate, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, octadecyl methacrylate, butoxyethyl acrylate, butoxyethyl methacrylate, other alkoxyethyl acrylates or methacrylates, and the like. Mixtures of to or more of these esters can be used, e.g., a mixture of ethyl acrylate and isobutylacrylate.

Applicable esters of α,β-unsaturated carboxylic acid in which the ester portion contains an oxirane ring are glycidyl acrylate, glycidyl methacrylate, monoglycidyl fumarate, monoglycidyl maleate, and monoglycidyl methyl maleate, as well as mixtures thereof.

Applicable monoethenically unsaturated compounds are vinyl aromatic compounds such as styrene, α-methyl styrene, vinyl toluene, the mono-chloro styrenes, vinyl acetate, vinyl chloride and vinylidene chloride, acrylonitrile, methacrylonitrile, and alkyl methacrylates having an alkyl group containing 1–5 carbon atoms. Mixtures of these compounds can be used, e.g., a mixture of styrene and methyl methacrylate.

Applicable α,β-unsaturated mono- and di-carboxylic acids are methacrylic acid, acrylic acid, crotonic acid, fumaric acid, maleic acid, citraconic acid, and itaconic acid. Mono-alkyl esters of these dicarboxylic acids can also be used. In place of the free acids and half-esters, there may be used water soluble salts thereof, including the ammonium salts and the alkali metal salts such as lithium or potassium carboxylates. Mixtures of these compounds can also be used, e.g., a mixture of acrylic acid and methacrylic acid.

Applicable protein reactants are isolated soluble protein; vegetable protein concentrates such as soya flour, and animal protein concentrates such as fish protein and casein; as well as synthetic protein materials such as polypeptides and single cell protein derived from fermentation in the presence of petroleum hydrocarbons. Specific protein reactants include a soya flour sold under the trademark "Kay Soy" by Archer Daniels Midland Company which contains at least 60% by weight soya bean protein mixed with about 30% by weight insoluble carbohydrate, 0.5% fat, 2.0% phosphatide, 2.0% fiber and 5.8% ash.

The purpose of the ester of the α,β-unsaturated carboxylic acid containing an oxirane functionality in the ester portion is theorized to be three-fold: first, to increase adhesion of the interpolymer to the substrate; second, to increase the hardness, strength, and solvent resistance of films cast from the final emulsion, and third, to chemically combine the reactive synthetic emulsion with the proteinaceous material. A film cast from an interpolymer prepared without this reactive ester lacks the adhesive strength, hardness, tack-free surface, solvent resistance, and toughness of a film prepared from an emulsion containing this α,β-unsaturated ester with an oxirane functionality in the ester portion. Also a blend of an interpolymer without this reactive ester and protein does not exhibit the solvent resistance and overall film properties of the reactive synthetic emulsion-protein complex. The α,β-unsaturated mono- or di-carboxylic acid is also utilized in a dual role. As an organic polymerizable acid it provides stability to the polymeric latex, particularly at pH levels about 6.5. More importantly, it is theorized that some of the acid functionality may react with the oxirane ring-containing ester of the α,β-unsaturated carboxylic acid or with the protein material. Since both the acid and ester are incorporated in the polymeric chains, this reaction provides partial cross-linking of the reactive synthetic with itself and with the protein in the system, and, thus yields an emulsion which gives more durable films. The purpose of the protein component is to render the interpolymers biodegradable as well as impart some graft-type polymer properties to the interpolymer. The biodogradability makes the interpolymers of this invention especially attractive as adhesives or binders for non-woven materials or any textile or paper articles particularly disposable articles. The latter theorized protein-synthetic emulsion grafting compliments the former by imparting better adhesive properties and solvent resistance to the interpolymers. The latter resulting reactive synthetic emulsion-protein polymer exhibits semi-permeable properties as well as water and solvent resistance properties, thus making those coatings attractive leather substitutes in film form.

Either anionic or non-ionic emulsifiers, or a blend of anionic and non-ionic emulsifiers, can be used in the reactive synthetic emulsion preparation. A specific representative non-ionic surfactant useful in emulsion polymerization of the present invention is nonylphenyl polyethylene glycol ether containing 10–12 ethylene oxide units. However, others may be selected from ethylene oxide condensates of long chain fatty acids and alkyl phenols or alcohols. With respect to the anionics, a large group is available from which one or more may be selected: sodium lauryl sulfate, salts of high molecular weight fatty acids and amino soaps, alkali metal salts of long or branched chain alkyl sulfates and sulfonates, sodium salts of mono- or di-sulfonated hydrocarbons, alkaryl sulfonates and the like.

The interpolymerization catalyst will usually and preferably be one of the following: potassium persulfate, ammonium persulfate, azo-bisisobutyronitrile, and cumene peroxide. Other suitable organic catalysts can be employed, alone or in combination with a typical reducing agent.

In order to further demonstrate the invention, the following examples are presented and are given in illustration; and are not intended as limitations on the scope of this invention. Where parts are mentioned, they are parts by weight.

EXAMPLE I

| Premix A: | Parts |
|---|---|
| Ethyl acrylate | 120.0 |
| Glycidyl acrylate | 11.0 |
| Styrene | 25.0 |
| Methacrylic acid | 6.0 |
| Premix B: | |
| Glycidyl acrylate | 3.0 |
| Styrene | 35.0 |
| Methacrylic acid | 4.0 |
| Protein: | |
| "Kay Soy" (described above) | 209.5 |
| Other: | |
| Sodium lauryl sulfate | 1.0 |
| Nonylphenyl polyethylene glycol ether (10 moles of ethylene oxide) | 5.0 |
| Potassium persulfate | 0.5 |
| Water | 270.0 |

The sodium lauryl sulfate, nonylphenyl polyethylene glycol ether, and water were charged into a glass-lined reactor fitted with an agitator, reflux condenser and inlet means for nitrogen. The reactor was swept with nitrogen and the contents were heated to 165° F. The catalyst, potassium persulfate, was then added. After approximately five minutes, premix "A" was slowly added to the reactor while maintaining rapid agitation. The addition was maintained at a rate so that excessive refluxing did not occur. During the addition, the temperature was permitted to rise to 195°–200° F.

After the addition of premix A was completed, premix B was added and the temperature was permitted to rise to 205° F. at which point the protein was added.

The resulting emulsion was then heated for two hours in the range of 185°–195° F.

The emulsion was cooled and the pH was adjusted to 8.0 with a 28% ammonia solution.

Then a .0015″ film of the emulsion was cast on a glass plate in a conventional and known manner. The film cured at room temperature to an opaque, tack free, flat film in 15 minutes. After one hour the film exhibited tough adhesion, good flexibility, fair mar resistance and poor resistance to water, laundry detergents and dry-cleaning solvents. Upon baking at 300° F. for 5 minutes, the mar resistance and resistance to water are improved. The film decomposed when exposed to conventional sewage treatment conditions.

EXAMPLE II

| Premix A: | Parts |
|---|---|
| Iso-butylacrylate | 100.0 |
| Glycidyl acrylate | 10.0 |
| Styrene | 35.0 |
| Methacrylic acid | 6.0 |
| Premix B: | |
| Glycidyl acrylate | 3.0 |
| Styrene | 45.0 |
| Methacrylic acid | 3.0 |
| Protein: | |
| "Kay Soy" (described above) | 95.5 |
| Other: | |
| Sodium lauryl sulfate | 1.0 |
| Nonylphenyl polyethylene glycol ether (10 moles of ethylene oxide) | 7.0 |
| Water | 246.0 |

The reactor was prepared as in Example I and the procedure of adding the premix A and premix B to the reactor was followed. However, the catalyst solution was slowly added while premix A and premix B were added. The times of addition for both monomer charges were the same as in Example I. The temperature in this example was permitted to rise to 205° F. at which point the protein was added. Post-heating was conducted for two hours at between 180°–200° F.

After the emulsion was cooled and adjusted to a pH of 8:1 with 28% ammonia solution, a .0015″ film was cast in a conventional manner. After 5 minutes at 300° F., an opaque, tack free, flat, water and solvent resistant film was obtained.

EXAMPLE III

| Premix A: | Parts |
|---|---|
| 2-ethylhexyl acrylate | 90.0 |
| Glycidyl acrylate | 9.0 |
| Styrene | 35.0 |
| Methacrylic acid | 6.0 |
| Premix B: | |
| Glycidyl acrylate | 3.0 |
| Styrene | 55.0 |
| Methacrylic acid | 2.0 |
| Protein: | |
| Kay Soy 300 C (an isolated vegetable protein) | 57.3 |

Other:
Potassium persulfate (4% sol.) _____ 20.0
Sodium lauryl sulfate _____ 2.1
Nonylphenyl polyethylene glycol ether (10 moles of ethylene oxide) _____ 7.0
Water _____ 226.0

The reactor was prepared as in Example I and the procedure of adding the premix A and premix B to the reactor was followed. During the course of the final addition, the temperature rose to 210° F. at which point the protein was added. In this example, one-fourth of the catalyst solution was added initially, and the remainder was slowly added during the course of the monomer additions.

The emulsion was brushed on a sample of non-woven cellulose at a level of 0.5–0.8 oz. adhesive solids per square yd., then a second sample of the non-woven material is pressed to the first and bonded thereto by the curing emulsion. After 5 minutes at 300° F., the two samples required 3 pounds of pull per 1 inch strip to separate them. The non-woven material with the cured emulsion thereon was then treated under conventional sewage treatment conditions. After 12 to 18 hours the cured emulsion was biodegraded.

EXAMPLE IV

Premix A: Parts
Ethyl acrylate _____ 110.0
Glycidyl acrylate _____ 4.5
Styrene _____ 50.0
Methacrylic acid _____ 1.5

Premix B:
Glycidyl acrylate _____ 7.5
Styrene _____ 32.0
Methacrylic acid _____ 7.5

Protein:
Isolated vegetable protein _____ 75.3

Other:
Sodium lauryl sulfate _____ 2.1
Nonylphenyl polyethylene glycol ether (10 moles of ethylene oxide) _____ 10.0
Potassium persulfate _____ 0.6
Water _____ 225.0

The reactor was prepared as in Example I and the procedure of adding the premix A and premix B to the reactor was followed. During the course of the final addition, the temperature rose to 210° F. at which point the protein was added. In this example, one-fourth of the catalyst solution was added initially, and the remainder was slowly added during the course of the monomer additions.

The emulsion from this example was used to form a coating on knitted cotton. After 5 minutes at 3000° F., the emulsion cured to a flexible film which was resistant to water and solvents. This coated knitted cotton thus serves as an excellent substitute for leather or vinyl fabrics.

The following example illustrates the use of a redox polymerization technique in the preparation of the interpolymers of this invention.

EXAMPLE V

Parts
Sodium salt of an alkylaryl polyether sulfonate (Triton X-200) _____ 3.0

Redox charge:
Water _____ 200.0
Ammonium persulfate _____ 1.0
Sodium metabisulfate _____ 1.0

Premix A:
Ethyl acrylate _____ 114.0
Styrene _____ 25.0
Glycidyl acrylate _____ 6.0
Methacrylic acid _____ 3.0

Premix B:
Styrene _____ 44.0
Glycidyl acrylate _____ 3.0
Methacrylic acid _____ 2.0

Protein:
Casein _____ 161.0

Other:
Triton X-201 _____ 1.0
Water _____ 43.0
Potassium persulfate _____ 0.5

The redox charge and premix A are mixed under rapid agitation and nitrogen sparging. An exothermic reaction from room temperature to 192° F. occurs in five minutes.

After the initial exothermic reactions, the emulsion is heated for 15 minutes and an emulsion of premix B and the remaining emulsifier, catalyst and water are slowly added. The temperature was permitted to rise to 205° F. at which point the protein was added. The mixture is then heated for two hours at 185° F., cooled to room temperature and neutralized with 28% ammonia. A film cast from this emulsion is similar in properties to the film described in Example I.

EXAMPLE VI

Parts
Sodium salt of an alkylaryl polyether sulfonate (Triton X-200) _____ 4.0
Water _____ 200.0
Potassium persulfate _____ 1.5

Premix A:
Ethyl acrylate _____ 110.0
Methyl methacrylate _____ 25.0
Glycidyl acrylate _____ 6.0
Acrylic acid _____ 3.0

Premix B:
Methyl methacrylate _____ 45.0
Glycidyl acrylate _____ 3.0
Acrylic acid _____ 1.0

Protein:
Fish protein _____ 48.25

The reactor was prepared as in Example I and the procedure of adding the premix A, premix B and the protein was followed. The emulsion was subjected to a post heat treatment as in Example I, cooled, and the pH adjusted to 8.0. A .0015″ cast film cured to an opaque, hard, flat film.

We claim:
1. A process for preparing a reactive synthetic emulsion-protein copolymer which comprises:
(I) forming a reactive synthetic emulsion by:
(1) polymerizing a mixture of the following monomers wherein the percentages of the various monomers are weight percentages based on the total weight of monomers used to form the reactive synthetic emulsion:
(a) 20–90% of an ester of α,β-unsaturated carboxylic acid,
(b) only a portion of a total amount of 20–1% of a glycidyl ester of α,β-unsaturated carboxylic acid,
(c) only a portion amounting to 10–70% by weight of a total amount of 50–8% of a monovinyl compound, and
(d) only a portion of a total amount of 10–1% of a compound selected from the group consisting of (i) monoesters of α,β-unsaturated dicarboxylic acids, (ii) α,β-unsaturated carboxylic acids, and (iii) salts thereof; and
(2) emulsion polymerizing the product of step (1) with the following:
(e) the remainder of (b),

(f) the remainder of (c), and
(g) the remainder of (d), and
(II) reacting the reactive synthetic emulsion produced in step (I) with soluble protein wherein the synthetic emulsion to protein ratio is between 8:1 and 0.3:1 at a temperature between 140° and 212° F. and at a pH between about 6 and 10.

2. The process of claim 1 wherein the total amounts of each of the monomers is:
(a) 35–75% of monomer (a);
(b) 10–2% of monomer (b);
(c) 45–10% of monomer (c); and
(d) 8–3% of monomer (d).

3. The process of claim 1 wherein monomer (a) is selected from the group consisting of ethyl acrylate, isobutyl acrylate, n-butyl acrylate, and 2-ethylhexyl acrylate; wherein monomer (b) is selected from the group consisting of glycidyl acrylate and glycidyl methacrylate; wherein monomer (c) is selected from the group consisting of styrene, vinyl acetate, vinyl chloride, vinylidene chloride, and alkyl methacrylates in which the alkyl portion contains 1–5 carbon atoms; wherein monomer (d) is selected from the group consisting of methacrylic acid, acrylic acid, and itaconic acid.

4. The process of claim 1 wherein the protein is selected from the group consisting of soya protein, casein, and single cell protein.

5. The process of claim 1 which includes the further step of heat treating the polymer formed in step (II) for about ½ to about 4 hours at a temperature of 140°–212° F.

6. The process of claim 5 wherein said heat treating is at a temperature of 160°–210° F.

7. The process of claim 5 wherein said heat treating is for about 2 to about 3 hours at a temperature of 180°–200° F. and wherein the pH of the heat treated polymer is subsequently adjusted to about 8.

8. The process of claim 5 wherein monomer (a) is selected from the group consisting of ethyl acrylate, isobutyl acrylate, n-butyl acrylate, and 2-ethylhexyl acrylate; wherein monomer (b) is selected from the group consisting of glycidyl acrylate and glycidyl methacrylate; wherein monomer (c) is selected from the group consisting of styrene, vinyl acetate, vinyl chloride, vinylidene chloride, and alkyl methacrylates in which the alkyl portion contains 1–5 carbon atoms; wherein monomer (d) is selected from the group consisting of methacrylic acid, acrylic acid, and itaconic acid; and the protein is selected from the group consisting of soya protein, casein and single cell protein.

9. The process of claim 1 wherein the synthetic emulsion to protein ratio is between 4:1 and 0.5:1.

10. The process of claim 1 which includes the further step of casting a film of the polymer formed in step (II) and curing said film.

11. The process of claim 1 which further includes the steps of neutralizing the polymer formed in step (II), casting a film with said neutralized polymer and curing said film.

12. The process of claim 1 wherein the polymer formed in step (II) is combined with a water soluble fungicide.

13. The process of claim 1 wherein the polymer formed in step (II) is combined with a water insoluble fungicide.

14. The product produced by the process of claim 1.
15. The product produced by the process of claim 4.
16. The product produced by the process of claim 8.
17. The cured film produced by the process of claim 10.
18. The cured film produced by the process of claim 11.
19. The product produced by the process of claim 12.
20. The product produced by the process of claim 13.

References Cited
UNITED STATES PATENTS

| | | | |
|---|---|---|---|
| 3,238,159 | 3/1966 | DiBenedetti et al. | 260—8 X |
| 3,297,621 | 1/1967 | Taft | 260—29.6 |
| 3,366,590 | 1/1968 | Taft | 260—29.6 |
| 3,403,116 | 9/1968 | Ream et al. | 260—8 |
| 3,425,968 | 2/1969 | Reiling | 260—8 |
| 3,501,301 | 3/1970 | Nadeau et al. | 260—8 X |
| 3,507,661 | 4/1970 | Ofstead | 260—8 X |
| 3,508,925 | 4/1970 | Whitely et al. | 260—8 X |
| 3,530,080 | 9/1970 | Inskip | 260—8 |
| 3,533,811 | 10/1970 | Clements et al. | 260—8 X |
| 3,535,275 | 10/1970 | Gilbert | 260—6 |

HOWARD E. SCHAIN, Primary Examiner

U.S. Cl. X.R.

117—124 E, 132 R, 143 A, 155 UA, 156, 161 UC, 161 UN, 161 UT, 164; 260—8, 29.6 EME, 78.5 BB, 78.5 UA; 424—81